United States Patent
McDaniel et al.

(10) Patent No.: US 12,541,827 B2
(45) Date of Patent: Feb. 3, 2026

(54) DEPTH IMAGE INTERPOLATION FOR MULTIVIEW ITEM RECOGNITION

(71) Applicant: NCR Voyix Corporation, Atlanta, GA (US)

(72) Inventors: Christian Lee McDaniel, Atlanta, GA (US); Stefan Bjelcevic, Roswell, GA (US); Layton Christopher Hayes, Rome, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 952 days.

(21) Appl. No.: 17/731,525

(22) Filed: Apr. 28, 2022

(65) Prior Publication Data

US 2023/0252609 A1 Aug. 10, 2023

Related U.S. Application Data

(63) Continuation-in-part of application No. 17/665,145, filed on Feb. 4, 2022.

(51) Int. Cl.
*G06T 5/77* (2024.01)
*G06Q 20/20* (2012.01)
(Continued)

(52) U.S. Cl.
CPC ............ *G06T 5/77* (2024.01); *G06Q 20/208* (2013.01); *G06V 20/50* (2022.01); *G06V 20/64* (2022.01);
(Continued)

(58) Field of Classification Search
CPC ........ G06V 10/16; G06V 10/82; G06V 20/64; G06V 20/50; G06V 20/52; G06T 5/77;
(Continued)

(56) References Cited

U.S. PATENT DOCUMENTS

2019/0108396 A1 4/2019 Dal Mutto et al.
2022/0019988 A1* 1/2022 Chilukuri ............... G06V 20/52

FOREIGN PATENT DOCUMENTS

CN 112750195 A * 5/2021 ............ G06T 15/04
CN 114049464 A * 2/2022 ........... G06F 18/253

OTHER PUBLICATIONS

EP Examination Report dated Feb. 14, 2025.

* cited by examiner

*Primary Examiner* — Tracy Mangialaschi
(74) *Attorney, Agent, or Firm* — Schwegman Lundberg & Woessner, P.A.

(57) ABSTRACT

Depth camera settings are adjusted based on characteristics of items presented in a scan zone and based on depth values returned for the items in depth images. Red-Green-Blue (RGB) images and depth images are captured of items within the scan zone. Quality of the depth values are accessed. Bad depth values are replaced with good known depth values. When the depth values are not replaced, one or more depth value interpolation algorithms are selectively processed to enhance the depth values. The depth values are processed to place each item within a specific location of the scan zone and map that location to pixel values in the corresponding RGB images. The pixel values from the RGB images are passed to a classification model and an item code is returned. The item codes are provided to checkout a customer without any scanning of item barcodes of the items.

14 Claims, 3 Drawing Sheets

(51) Int. Cl.
*G06V 20/50* (2022.01)
*G06V 20/64* (2022.01)
*H04N 13/128* (2018.01)
*H04N 13/254* (2018.01)

(52) U.S. Cl.
CPC ......... *H04N 13/128* (2018.05); *H04N 13/254* (2018.05); *G06T 2207/10024* (2013.01); *G06T 2207/10028* (2013.01)

(58) Field of Classification Search
CPC .......... G06T 2207/10024; G06T 2207/10028; G06Q 20/208; H04N 13/128; H04N 13/254; H04N 23/10; H04N 23/60
See application file for complete search history.

DEPTH IMAGE INTERPOLATION FOR MULTIVIEW ITEM RECOGNITION

RELATED APPLICATIONS

The present application is Continuation-In-Part (CIP) of application Ser. No. 17/665,145 entitled "Multi-Item Product Recognition for Checkouts" filed on Feb. 4, 2022, the disclosure of which is incorporated in its entirety herein and below.

BACKGROUND

Recently, cameras that were able to produce depth information became far less expensive to purchase and use. One example of such a camera is the LiDAR (Light Detection And Ranging). Lasers are used to measure distances and obtain depths of surfaces from the objects captured by the camera/scanner. The 3D (three-dimensional) images are grayscale images, that use the distances measured between the surfaces of the objects to the camera. Typically, a separate image is captured of Red-Green-Blue (RGB) light reflected from the objects as a 2D (two-dimensional) object. A 3D color image is created by merging/combining the grayscale image with depth information to the RGB image. The depth information (depth readings) are combined to form a composite 360 degree-reconstruction of the space captured in the RGB image and the depth readings of the grayscale image. Thus, the quality of the depth values directly impacts the resulting 3D reconstruction of the objects in the space.

However, obtaining accurate depth readings is a challenge. Moreover, there are inherent limitations in the various techniques used to obtain the depth readings and there are specific aspects of some real-world surfaces that further hinder adequate depth readings. For example, dark and shiny objects throw off the depth measurements, causing incorrect or even missing depth values.

Depth interpolation is a post image-capture process that fills in or corrects missing or erroneous information. For example, "hole filing" can easily fill a small section of missing values based on surrounding depth values, assuming the surrounding values are in fact accurate. "Smoothing" removes pointwise aberrant readings by making a single surface more uniform. There are other approaches to depth interpolation as well.

However, conventional interpolation approaches assume that are sufficiently enough good quality depth values that can be identified and fixed by address the poor-quality values. This is not always the case, as in situations where an object's entire surface is shiny or dark.

Accurate depth information is essential for multiview item recognition where multiple items in a transaction area are captured in multiple images (multiview) simultaneously and the images processed to assign item codes (item recognition) to each of the items. Here, items can and often are occluded in some if not all of the images, so accurately identifying the RGB data associated with each item is of import in order to precisely assign each individual item to a location within the physical space of the transaction area. This allows the correct item RGB data to be obtained and processed to identify each item.

SUMMARY

In various embodiments, a system and methods for depth image interpolation for multiview item recognition are presented.

According to an embodiment, a method for depth image interpolation for multiview item recognition is provided. Depth camera settings are selectively adjusted for cameras. Red-Green-Blue (RGB) images and depth images of items placed in a scan zone during a checkout of a customer are captured. Existing depth values for the depth images are replaced with model depth values when the existing depth values are determined to be insufficient. The existing depth values are enhanced for the depth images by processing one or more depth interpolation algorithms when the depth values are determined to be sufficient to mitigate noise, missing values, or erroneous values. The depth values and any model depth values are processed to identify RGB data in each RGB image that is associated with each item. An item code is provided for each item within the scan zone using the corresponding RGB data.

DETAILED DESCRIPTION

Figure 1:
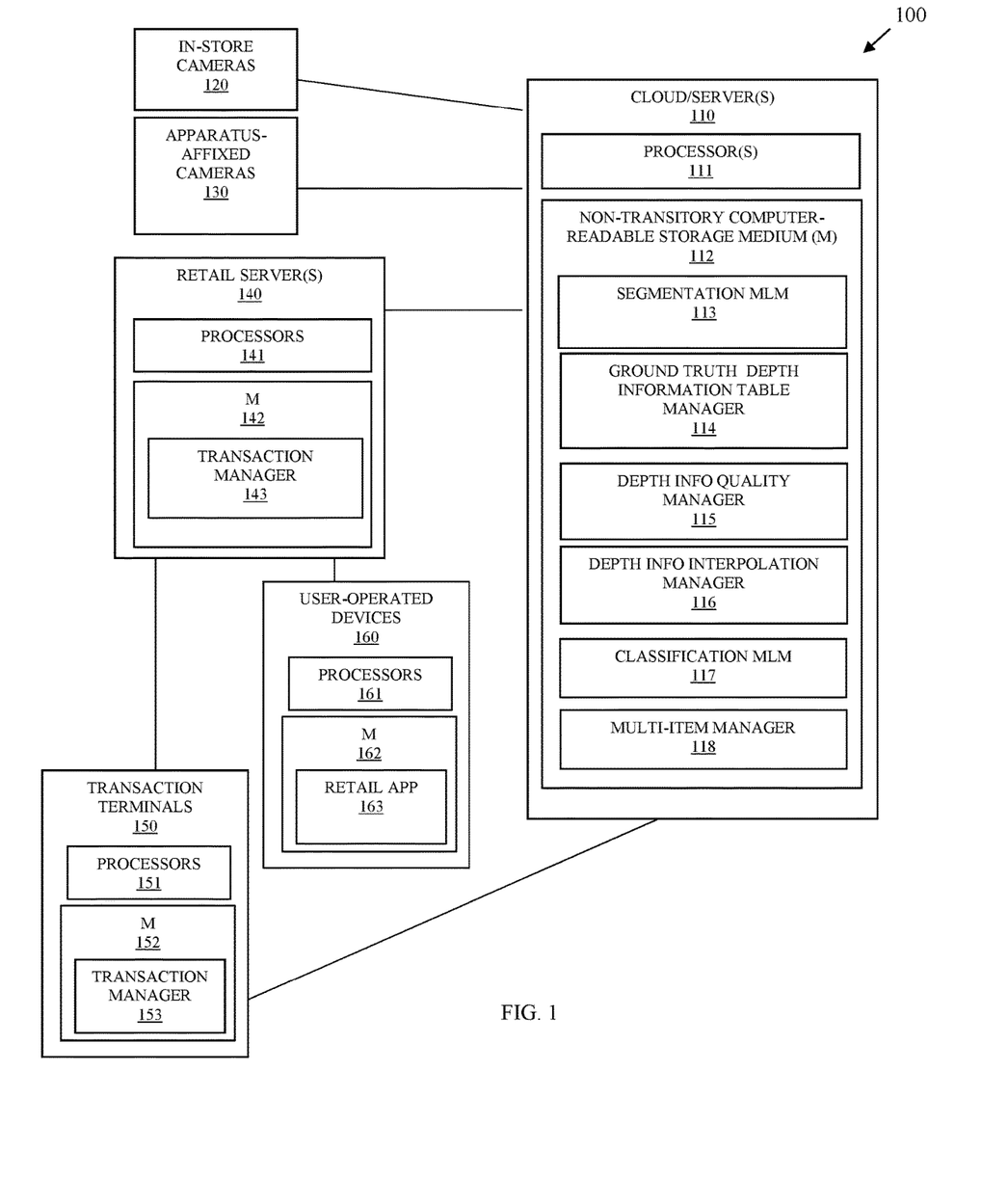
FIG. 1 is a diagram of a system for depth image interpolation for multiview item recognition, according to an example embodiment.

FIG. 1 is a diagram of a system 100 for depth image interpolation for multiview item recognition, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of depth image interpolation for multiview item recognition technique, presented herein and below.

As used herein a "scene" refers to a defined area where a set or multi-items of a customer are being monitored through multiple images taken at multiple different angles. The multi-items can be stationary or can be moving with the customer in a basket, a cart, in their hands and arms, or in a bag. The area can be any predefined shape, predefined size, and predefined dimensions. The term "scene" may be used synonymously and interchangeably herein with the phrase "transaction area." This refers to a physical space (inside surfaces of a cart, bag, and/or basket or a countertop of a transaction terminal) where multiple images (multiview) of multiple transaction items are captured. The item placed in the transaction area representing a scene of the transaction area for the items.

System 100 illustrates techniques by which rules-based decisions can be made as to when and how to use different depth interpolations techniques and/or whether to select and replace depth readings returned for an unknown item with known good depth readings associated with a modeled item that has a similar size, shape, and dimensions as unknown item.

As stated above, depth interpolation is essential for filling and correcting missing or erroneous depth values obtained from a camera. There are multiple processing steps used by system 100 that start with the settings of the camera itself to obtain baseline depth values. The depth baseline values are subsequently accessed by rules for their quality and then passed to existing or know depth interpolation algorithms for processing or customer depth interpolation algorithms or processes are deployed when the baseline depth values are poor quality. Following the processing of an existing depth interpolation algorithm or the processing of a customer algorithm or process, the depth images are further accessed for outliers to further smooth the depth values. This ensures that accurate depth values are being used when attempting to determine where each item is located within a transaction area into order to properly obtain the corresponding item's RGB data from each of the RGB images associated with the multiview of the transaction area.

Initially, system 100 analyzes the camera settings of each camera associated with the multiview of the transaction area. A highest possible depth value is obtained from each of the cameras, the settings are then tuned to optimally capture depth values given a typical surface in an image.

Moreover, adjustments can be made to a camera's emitter and temporal filtering. The cameras deployed for the multiview item recognition includes an Infrared (IR) light emitter, which projects a textured light pattern over a target area (transaction area). Projecting an IR texture can improve depth readings by providing landmark regions which can be matched between stereo cameras. However, IR projection can also prove detrimental in some cases, particularly when the target in the transaction area/scene is glossy/reflective. To take advantage of the positive aspects of IR light emission while mitigating the negative aspects, a setting for the cameras is used which turns the emitter feature for the corresponding camera on for a frame, off for a frame, on for a frame, and so on. This alternating frame emitter one/off feature is then combined with a temporal filter, which retains depth data that is present in at least 2 of the past 8 frames. This improves the density data without a significant loss of accuracy.

Additionally, system 100 measures depth data quality for difficult objects (items presenting in the target area). Glossy/Reflective objects with smooth textures are difficult for stereo-depth cameras to generate dense and accurate depth data. To improve the quality in the depth data, the items that cause such issues were preprocessed by wrapping such items in masking tape creating "mummy objects/items." Masking tape is both textured and non-reflective. By precisely marking the exact positions of each mummy object within the target area and capturing corresponding depth information for each mummy object at each position and then comparing the accurate depth information against erroneous depth information of an unmasked object at each position from the cameras, a detailed and ideal depth information mapping was created.

A variety of metrics were then collected to quantify the depth mapping for each combination of camera settings, such as percentage of target area (mummy item version) with depth data (regular non-mummy item version); mean squared error between distance measurements (mummy versus non-mummy); Intersection over Union (IoU) of mummy versus non-mummy, etc.

Once the camera settings are adjusted and the mummy detailed settings mapping created, existing depth interpolation is addressed by system 100. After the depth data is ingested from the cameras, depth interpolation on the corresponding depth images is processed to automatically to mitigate noise, erroneous values, and missing values. A variety of approaches are taken to interpolate missing or incorrect depth values. Some existing algorithms include grid-based smoothing (hole-filing) and setting a specific pixel based on the surrounding pixels. Aggregating the surrounding pixels' values include nearest average of n-nearest values; linear fill in the current pixel to fit a linear distribution based on the surrounding pixel values; cubic spline interpolation, fill in the current pixel to fit a cubic distribution based on the surrounding pixel values; inverse weighted, and update the value of the current pixel based on the surrounding pixels' values weighted inversely by distance from the current pixel.

Other existing depth interpolation include algorithms for erosion wherein a kernel is used to sharpen edges (areas where the depth values change drastically) and reduce/smooth the size of shapes (areas of lower depth values surrounded by higher depth values) to remove noise.

Dilation algorithms are also processed with existing algorithms, to use a kernel to broaden shapes to join disconnected regions of low depth values separated by small sections of high depth values (of vice versa).

Still further contour selection is used to identify the shape boundaries in the image as regions of connected low depth values (closer-up items) surrounded by higher depth values (background) (or vice versa).

Weighted average of multiple methods and/or a combination of multiple methods in series can be processed with existing depth interpolation techniques of system 100.

It is noted that the above-noted depth interpolation techniques discussed are not exhaustive and others existing depth interpolation algorithms can be used as well with system 100.

System 100 anticipates that even after the camera settings are adjusted and the depth interpolation algorithms are processed, there still may be outliers that require removal from the depth data. Outliers are depth values that are significantly different from the surrounding depth values. System 100 employs a variety of customer outlier removal techniques on the depth values, such as Geometric Rectifier where depth images are calculated in 2D spaces as the distance of each pixel location from a camera's view. Since the cameras are viewing the scan zone from a specific angle (e.g., 45-degree angle looking down at the transaction area/scan zone), the same distance value at any two-pixel locations are not along the global x-axis and y-axis of the scan zone, but instead are distributed along a curve extending outward from the face of the corresponding camera. By using the depth values to project the 3D RGB image into a 3D space, the actual spread of the points along the x, y, and x axes of the scan zone are measured to further inform how distance the distance values are, according to the 360-degree real-world perspective. Threshold outlier removal is performed to remove any point that has a distance to any other point greater than some threshold value set. Statistical outlier removal accesses relative distance between points based on statistics; for example, calculate a z axis score of each point, measured by the number of standard deviations a point is away from an observed mean of all other points' interpoint distances; remove points whose z-score is above a threshold.

Again, the outlier removal algorithms listed above can include other algorithms with system 100.

System 100 also provides a custom alternative, that does not rely on the incoming depth images. This is due to the nature of some objects, which have surfaces that are all or mostly dark, shinny or otherwise difficult to obtain accurate depth readings for—the depth readings may be missing or may be inaccurate for all or most of an object (item). In these cases, that are not enough accurate depth values to inform how to update the missing or inaccurate depth values. In these cases, system 100 fully replaces the missing/inaccurate depth values for "ground truth" depth values of high quality (as discussed above with the mummy objects).

The process is a novel Lookup depth interpolation process referred to herein as KNN. When an item (object) is determined to yield problematic depth readings (such as a Coca-Cola® bottle that has a dark and shiny uniform surface and appearance), an item with a same shape as the problematic item but which has a surface that yields good quality depth values is referred to as a "ground truth item." If there is no ground truth item, once can be generated by coating the surface of the item in a brighter, textured, and matte coating—such as with masking tape as was discussed above with the mummy objects. The ground truth item is then placed in various locations around the scan zone/transaction area. The more locations sampled; the more accurate the matching depth values are. For example, translating the Coke® bottle 1 inch laterally or horizontally between each location yields good results. Fewer locations may be used as a tradeoff to quality. At each location within the scan zone depth and RGB images of the item in the scene are captured. The depth images are labeled as the ground truth. For the RGB image, a binary mask image is generated, which contains 1's (pixel values) within the boundary of the image and 0's (pixel values) everywhere else. The mask is used to select the correct ground truth depth values from a lookup table (discussed below). If there are multiple items that yield poor quality depth values, the above process is repeated for each item and the associated depth and mask images are stored in the lookup table.

If two problematic items have the same shape, they do not need separate depth and mask images in the lookup table. A single set of ground truth images can be used for any items of a same shape. If too may types of items are added to the KNN lookup table, inference (the process of matching an incoming mask to a mask in the lookup table) may take longer to resolve than may be desired due to the large number of items in the KNN lookup table. As a result, multiple tables may be maintained by system 100, each table has the ground truth for a single type of item—for example all items with a same shape. To select the correct table, shape analysis is conducted on incoming RGB images. Other options that can be uses are to stratify by volume, or some other visual statistic for table resolution when multiple tables are used with system 100.

When a vision-based checkout is being processed on a scene of the scan area/transaction area, boundaries are generated which outline each item in each camera's view. These segmentation boundaries can be applied to the depth images to obtain the region containing a specific item. For each item, system 100 determines whether the corresponding depth values are poor quality. This can be done in a variety of manners, such as analyzing the smoothness of the depth values, the number of missing or "infinity" values (which occurs when a depth reading cannot be obtained at a given pixel location, etc.

If the depth readings for an item are deemed to be poor quality, the mask for the item is obtained, the mask is passed to the KNN lookup table (if there are multiple tables, perform shape analysis on the RGB image before selecting the proper KNN lookup table). The ground truth depth values associated with the ground truth mask that is the closest match to the mask for the item in the scene is returned. In this way, the poor-quality depth values have been substituted by high quality depth values for the nearest location as the item in the scene.

This substitution only needs processed for items that yield fully or mostly inaccurate depth readings. To determine the quality of a given item's depth readings, system 100 looks at the depth values inside the mask for the object (item) (where the mask is obtained from the RGB image). The mask is applied to the depth image, such that only the depth values inside the segmentation boundary are looked at for a given object/item. Since RGB segmentation is not always entirely accurate, in such cases background subtraction can be processed.

When one or more items are placed in the scan zone/transaction area, system 100 measures the places where the depth values are different from those in the background image above a certain noise threshold. Even if the depth values are missing or erroneous, they are unlikely to be similar to the background depth values as if an item was not there (not present). By taking only the locations where the depth values are significantly different from the background, system 100 can further identify segmentation of the item's depth values. If the depth values are high quality, an assumption is made of a smooth, mostly linear or parabolic (curved) distribution of depth values as the reflect a flat or a curved surface. A flat item standing up in the scan zone (like a box of crackers) will have a face that is largely uniform. If the box is laid flat on its back within the scan zone, the depth values will linearly increase along its face as it moves further away from the camera from bottom to top. A bottle standing upright will have a smooth curved surface, the smoothness of the depth values can be measured within the mask to measure noise.

Additionally, shiny or dark objects may result in missing depth values for depth values set to "infinity" or some other outlier value. System 100 measures the proportion of these outliers to determine incorrect readings. If an item is deemed to have yielded good quality depth values, system 100 does not need to replace its depth values.

Performing KNN lookup using an entire mask image as features can be timely (relatively, in terms of real-time performance requirements of multiview item recognition) and difficult for KNN in terms of accuracy and predictions. Given a mask image that is 100×100 (meaning there are 100 pixels in the x-axis and 100 pixels in the y-axis), this is stored in the KNN model as a flattened array of length 100×100=10,000. Images from the cameras are even larger than this. Thus, system 100 resizes the image to smaller dimensions reducing the dimensionality and improving KNN performance, with little information lost during resizing. KNN also uses a "distance metric: to assess similarity of the incoming mask to the masks stored in the KNN lookup table. Alternative distance functions show differences in performance. For example, Euclidean distance weights each portion of the feature vector the same. Cosine of Mahalanobis distance are potential alternatives used showing better performance than a Euclidean distance calculation.

Additionally, system 100 may use alternatives to using the raw mask image of an item. The reason for using the mask is that it inherently encodes the location of the item based on where the nonzero pixels are in the image. A description of the location can be calculated by taking the x and y coordinates of the center of the mass (item) or a specific corner (e.g., bottom-left corner) of the grouping of non-zero pixels. System 100 may also use a statistic to encode the location of a masked item, this simplifies the matching problem for the picking the correct mummy object from the lookup tables.

System 100 optimizes camera settings for multiview item recognition where item distances from the cameras are critical to placing the item in a specific physical location from the depth images into a scan area/transaction area. The item depth information and the item's location within the scan zone allows each item's specific RGB data to be separated and obtained from multiple images of the transaction area or purposes of each item's recognition. Background subtraction from background pixels associated with an empty transaction area is processed to improve item segmentation within the RGB images. A modular workflow pipeline can be processed to process existing depth interpolation algorithms on the depth values in the depth images. Bad depth values are completely replaced with ground truth depth values for a mummy object. The RGB mask shape analysis or another metric can be used on the masked object to locate a proper KNN lookup table that provides the ground truth depth values. The 3D information is analyzed to determine the quality of depth information and conditional interpolation on the depth values or replacement of the depth values is processed based on the quality determined.

Various embodiments are now discussed in greater detail with reference to FIG. 1.

System 100 comprises a cloud/server 110, in-store cameras 120, apparatus-affixed cameras 130, one or more retail server 140, transaction terminals 150, and user-operated devices 160.

Cloud/Server 110 comprises a processor 111 and a non-transitory computer-readable storage medium 112. Medium 112 comprises executable instructions for a segmentation Machine-Learning Model (MLM) 113, ground truth depth information manager 114, depth information quality manager 115, depth information interpolation manager 116, a classification MLM 117, and a multi-item manager 118. The executable instructions when provided or obtained by the processor 111 from medium 112 cause the processor 111 to perform operations discussed herein with respect to 113-118.

In-store cameras 120 may be stationary cameras placed throughout a store, such as overhead cameras situated overhead of transaction areas of terminals 150 and/or situated along side countertops associated with terminals 150.

Apparatus-affixed cameras 130 may be affixed to the sides of baskets and carts. One camera 130 for a cart or a basket may be placed along a top edge of the cart or basket and pointed down into the basket or cart. Other cameras 130 for the cart or basket may be affixed to 2 or more sides of the cart or basket focused into the cart or basket.

In an embodiment, only apparatus-affixed cameras 130 are used for the embodiments discussed below.

In an embodiment, only in-store cameras 120 are used for the embodiments discussed below.

In an embodiment, a combination of in-store cameras and apparatus-affixed cameras 130 are used for the embodiments discussed below.

In an embodiment, 3 cameras 120 and/or 130 are used for the embodiments discussed below.

In an embodiment, 4 cameras 120 and/or 130 are used for the embodiments discussed below.

In an embodiment, 5 or more cameras 120 and/or 130 are used for the embodiments discussed below.

In an embodiment, one, some combination, or all of the cameras 120 and/or 130 are depth cameras.

Each retail server 140 comprises at least one processor 141 and a non-transitory computer-readable storage medium 142. Medium 142 comprises executable instructions for a transaction manager 143. The executable instructions when provided or obtained by the processor 141 from medium 142 cause the processor 141 to perform operations discussed herein with respect to 143.

Each transaction terminal 150 comprises at least one processor 151 and a non-transitory computer-readable storage medium 152. Medium 152 comprises executable instructions for a transaction manager 153. The executable instructions when provided or obtained by the processor 151 from medium 152 cause the processor 151 to perform operations discussed herein with respect to 153.

Each user-operated device 160 comprises at least one processor 161 and a non-transitory computer-readable medium 162. Medium 162 comprises executable instructions for a retail application (app) 163. The executable instructions when provided or obtained by the processor 161 from medium 162 cause the processor 161 to perform operations discussed herein with respect to 163.

Initially, a segmentation MLM 113 is trained to return RGB masks for items present within multiple images taken by the cameras 120 and/or 130. The masks have pixel values labeled with 1 and background pixels set to 0 as output produced by the segmentation MLM 113. Ground truth depth information table manager 114 is also populated by creating mummy objects with ground truth depth values for the cameras 120 and/or 130 for items that are known to be associated with bad depth information (depth information way out of range, missing, associated with infinity values, etc.). The items are generally items that are shiny and dark but can be other types of items discussed above. Manager 114 maintains a plurality of KNN tables with the ground truth values for a mummy object. The mummy object is the item wrapped in a textured and non-reflective material, such as masking tape. Each mummy object is moved around the transaction area and captured by the cameras 120 and 130. The depth images associated with comprises depth values that are then stored by location within the transaction area within the corresponding KNN table. Again, objects/items that are similar in shape and size do not have to individually have a mummy object since the ground truth depth values for these similar items will be the same even though the items are in fact different. This process is repeated until each item associated with known bad depth values are associated with a given KNN table.

Depth information quality manager 115 is responsible for initially adjusting the depth settings on the cameras 120 and 130 as discussed above, such as alternating an IR textured pattern from frame to frame, and any of the above-discussed depth settings. Manager 115 is also responsible for initially assessing the depth values returned from the cameras 120 and/or 130 to determine whether the depth values can or cannot be used or can be adjusted by depth information interpolation manager 116. Depth values that are out of range, missing, or set to infinity are flagged for replacement of ground truth values by manager 115. The mask of the RGB image returned by segmentation MLM 113 is analyzed for shape or other statistic as discussed above. The shape or other statistic allows manager 115 to obtain the proper KNN table when replacing depth values, the distance from the center of the mask to the cameras 120 and 130 is used to select the proper depth values to uses as replacement depth values for a given depth image.

When the depth information quality manager 115 does not determine based on the depth value quality analysis that a given depth image of the target area requires use of ground truth values (no items that are known to be problematic and create bad depth values), the depth images and corresponding depth values are based to the depth interpolation manager 116. Manager 116 further inspects the depth values and performs any of the above-noted interpolation techniques (algorithms) to adjust the depth values for the depth images.

Once the depth values are interpolated and/or replaced with ground truth depth values by manager 115 and/or manager 116, multi-item manager 118 uses the depth values to pinpoint each item's physical location within the scan zone when the multiple images (depth images and RGB images) captured the items. Each item's physical location is then mapped into the RGB images to identify each item's unique RGB data for each of the RGB images captured of the transaction area. The RGB data (pixel values) for each unknown item within the scan zone/transaction area are then passed by manager 118 to an item classification MLM 117, which returns for each RGB image a potential item code. Manager 118 then processes rules to select a unique item code for each item and returns the item codes for all the items that were present within the scan zone to transaction manager 143 and/or 153. Transaction manager 143 and/or 153 processes the item code to checkout a customer without any of the item codes for the item having been scanned.

In an embodiment, depth information quality manager 155 performs background subtraction on the masked/segmented items returned as output from segmentation MLM 113, this allows for the depth values remaining in the depth images to be more accurately analyzed for their quality and allows for more accurate shape analysis and/or other statistical analysis to be used when locating a proper KNN table with ground truth depth values when needed. In other words, manager 115 has known depth information for the background of the scan zone and can retain the mask pixels that are significantly different from what is expected for background objects (countertop, inside a basket, inside a cart, inside a bag, etc.).

In an embodiment, the depth images and depth values in the KNN tables for the mummy objects are reduced in size by resizing the images and/or reducing dimensionality of the images.

In an embodiment, the transaction area of the scan zone/transaction area is 12 inches by 16 inches or roughly corresponds to the size of a cart, a food tray, a basket or a countertop at a convenience store.

These embodiments and other embodiments are now discussed with reference to the FIGS. 2-3.

Figure 2:
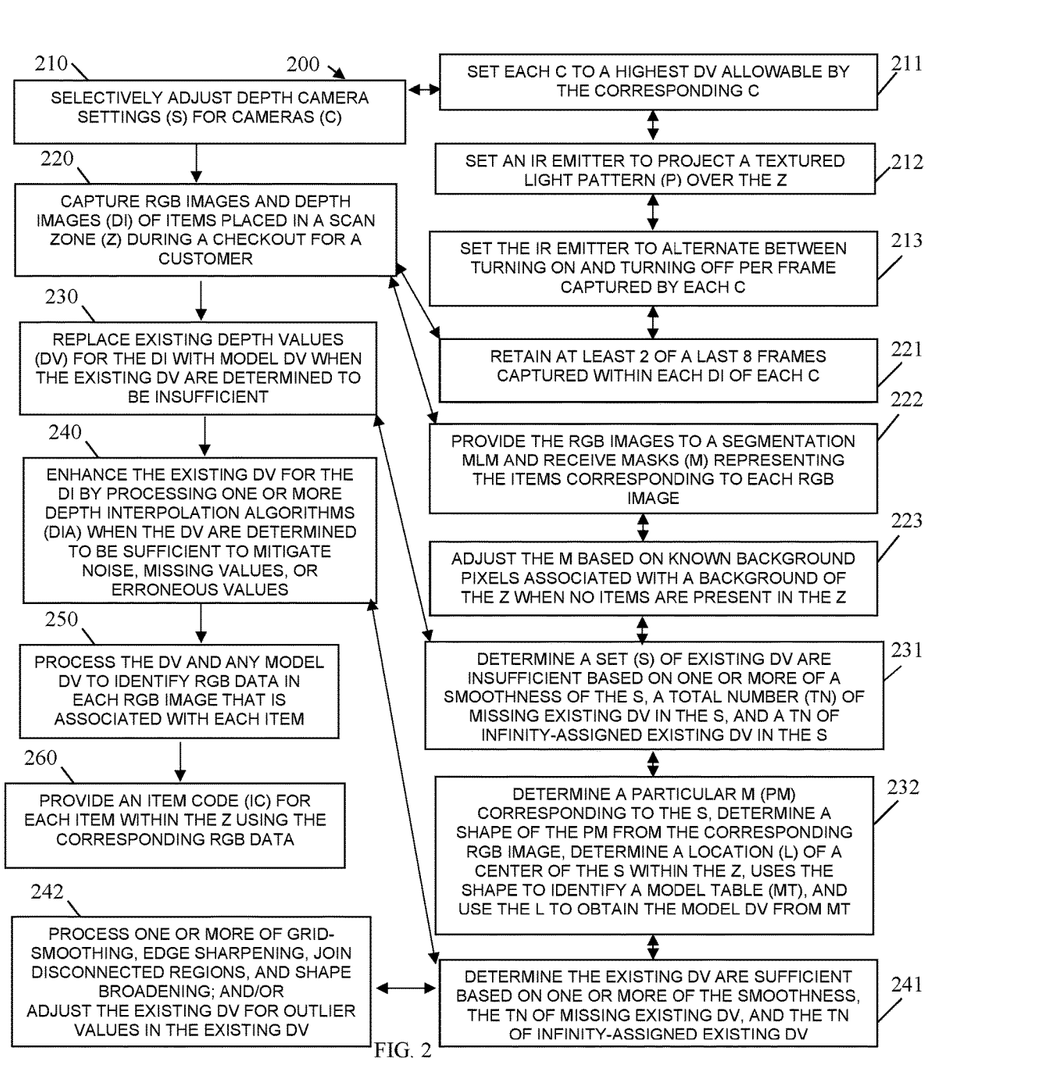
FIG. 2 is a diagram of a method for depth image interpolation for multiview item recognition, according to an example embodiment.

FIG. 2 is a diagram of a method 200 for depth image interpolation for multiview item recognition, according to an example embodiment. The software module(s) that implements the method 200 is referred to as a "multiview item recognition depth image interpolator." The multiview item recognition depth image interpolator is implemented as executable instructions programmed and residing within memory and/or a non-transitory computer-readable (processor-readable) storage medium and executed by one or more processors of a device. The processor(s) of the device that executes the multiview item recognition depth image interpolator are specifically configured and programmed to process the multiview item recognition depth image interpolator The multiview item recognition depth image interpolator has access to one or more network connections during its processing. The network connections can be wired, wireless, or a combination of wired and wireless.

In an embodiment, the multiview item recognition depth image interpolator executes on cloud 110. In an embodiment, the multiview item recognition depth image interpolator executes on server 110.

In an embodiment, the multiview item recognition depth image interpolator is all or some combination of 113, 114, 115, 116, 117, and 118.

At 210, the multiview item recognition depth image interpolator selectively adjusts depth camera settings for cameras 120 and/or 130.

In an embodiment, at 211, the multiview item recognition depth image interpolator sets each camera to a highest depth value allowable by the corresponding camera 120 and/or 130.

In an embodiment of 211 and at 212, the multiview item recognition depth image interpolator sets an IR emitter to project a textured light pattern over the scan zone.

In an embodiment of 212 and at 213, the multiview item recognition depth image interpolator sets the IR emitter to alternate between turning on and turning off per frame captured by each camera 120 and/or 130.

At 220, the multiview item recognition depth image interpolator captures RGB images and depth images of items placed within the scan zone.

In an embodiment of 213 and 220, at 221, the multiview item recognition depth image interpolator retains at least two of a last eight frames captured within each depth image of each camera 120 and/or 130.

In an embodiment, at 222, the multiview item recognition depth image interpolator provides the RGB images to a segmentation MLM 113 and receives masks representing the items corresponding to each RGB image.

In an embodiment of 222 and at 223, the multiview item recognition depth image interpolator adjusts the masks based on known background pixels associated with a background (objects and surfaces) of the scan zone when no items are present within the scan zone.

At 230, the multiview item recognition depth image interpolator replaces existing depth values for the depth images with model depth values when the existing depth values are determined to be insufficient.

In an embodiment of 223 and 230, at 231, the multiview item recognition depth image interpolator determines a set of existing depth values are insufficient based on one or more of: a smoothness of the set, a total number of missing existing depth values in the set, and a total number of infinity-assigned existing depth values in the set.

In an embodiment of 231 and at 232, the multiview item recognition depth image interpolator determines a particular mask corresponding to the set, determines a shape of the particular mask from the corresponding RGB image, determines a location of a center of the shape within the scan zone, uses the shape to identify a model table, and uses the location to obtain the model depth values from the model table.

At 240, the multiview item recognition depth image interpolator enhances the existing depth values for the depth images by processing one or more depth interpolation algorithms when the depth values are determined to be sufficient to mitigate noise, missing values, and/or erroneous values in the existing depth values.

In an embodiment of 232 and 240, at 241, the multiview item recognition depth image interpolator determines the existing depth values are sufficient based on one or more of the smoothness of the existing depth values, the total number of missing existing depth values, and the total number of infinity-assigned existing depth values.

In an embodiment of 241 and at 242, the multiview item recognition depth image interpolator processes one or more of grid-smoothing depth interpolation algorithms, edge sharpening interpolation algorithms, and shape broadening interpolation algorithms. In an embodiment, the multiview item recognition depth image interpolator also or alternatively adjust the existing depth values for outlier values in the existing depth values.

At 250, the multiview item recognition depth image interpolator processes the depth values, and any model depth values to identify RGB data in each RGB image that is associated with each item present within the scan zone.

At 260, the multiview item recognition depth image interpolator provides an item code for each item within the scan zone using or based on the corresponding RGB data.

Figure 3:
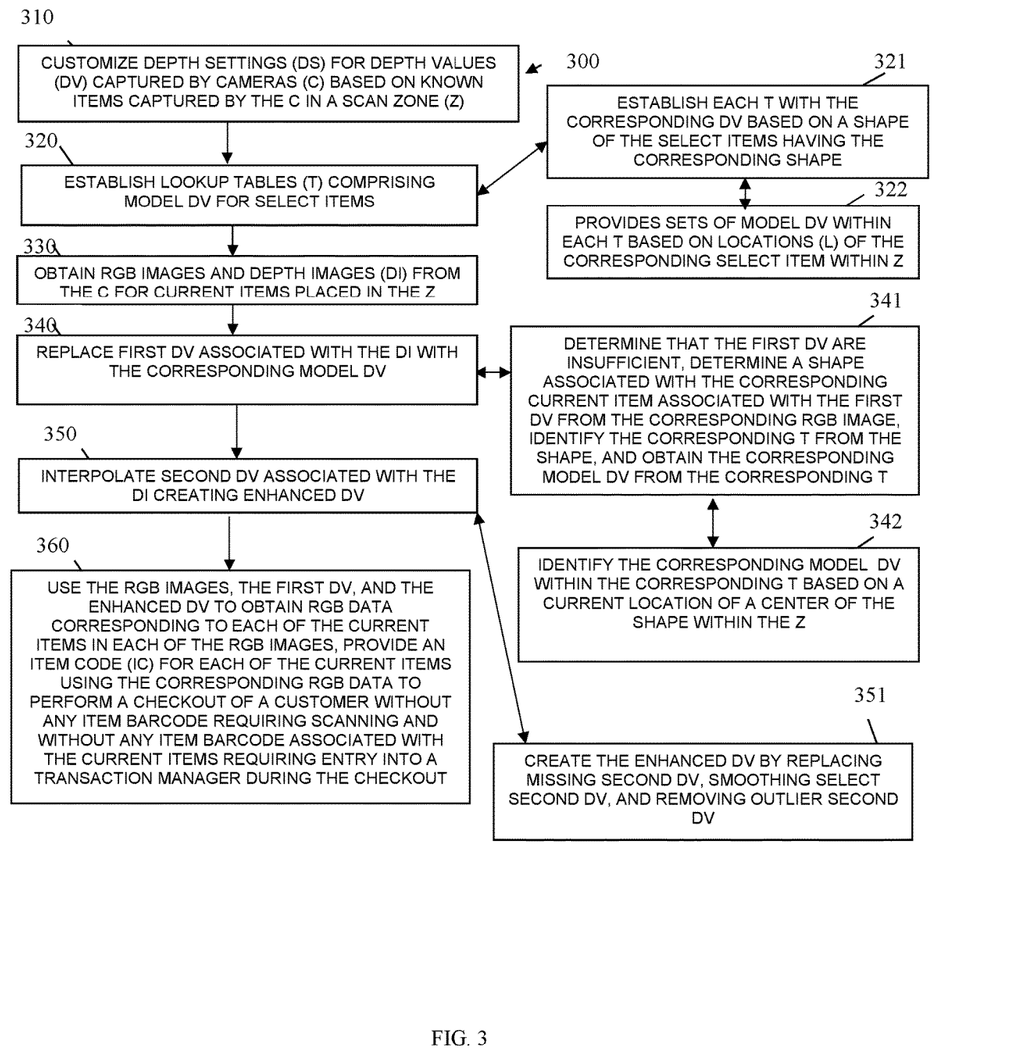
FIG. 3 is a diagram of another method for depth image interpolation for multiview item recognition, according to an example embodiment.

FIG. 3 is a diagram of another method 300 for depth image interpolation for multiview item recognition according to an example embodiment. The software module(s) that implements the method 200 is referred to as a "depth image enhancement manager for multiview item recognition." The depth image enhancement manager for multiview item recognition is implemented as executable instructions programmed and residing within memory and/or a non-transitory computer-readable (processor-readable) storage medium and executed by one or more processors of a device. The processor(s) of the device that executes the depth image enhancement manager for multiview item recognition are specifically configured and programmed to process the depth image enhancement manager for multiview item recognition. The depth image enhancement manager for multiview item recognition has access to one or more network connections during its processing. The network connections can be wired, wireless, or a combination of wired and wireless.

In an embodiment, the device that executes the depth image enhancement manager for multiview item recognition is cloud 110. In an embodiment, the device that executes the depth image enhancement manager for multiview item recognition is server 110.

In an embodiment, the depth image enhancement manager for multiview item recognition is all or some combination of 113, 114, 115, 116, 117, 118, and/or method 200.

At 310, the depth image enhancement manager for multiview item recognition customizes depth settings for depth values captured by cameras 120 and/or 130 based on known items captured by the cameras 120 and/or 130 in a scan zone.

At 320, the depth image enhancement manager for multiview item recognition establishes lookup tables comprising model depth values for select items.

In an embodiment, at 321, the depth image enhancement manager for multiview item recognition establishes each table with the corresponding depth values based on a shape of the select items having the corresponding shape.

In an embodiment of 321 and at 322, the depth image enhancement manager for multiview item recognition provides sets of the model depth values within each table based on locations of the corresponding select item within the scan zone.

At 330, the depth image enhancement manager for multiview item recognition obtains RGB images and depth images from the cameras 120 and/or 130 for current items placed within the scan zone.

At 340, the depth image enhancement manager for multiview item recognition replaces first depth values associated with the depth images with the corresponding model depth values.

In an embodiment, at 341, the depth image enhancement manager for multiview item recognition determines that the first depth values are insufficient, determines a shape associated with the corresponding current item associated with the first depth values from the corresponding RGB image, identifies the corresponding table from the shape, and obtains the corresponding model depth values from the corresponding table.

In an embodiment of 341 and at 342, the depth image enhancement manager for multiview item recognition identifies the corresponding depth values from the corresponding depth values from within the corresponding table based on a current location of a center of the shape within the scan zone.

At 350, the depth image enhancement manager for multiview item recognition interpolates second depth values associated with the depth image creating enhanced depth values.

In an embodiment, at 351, the depth image enhancement manager for multiview item recognition creates the enhanced depth values by replacing missing second depth values, smoothing select second depth values, and removing outlier second depth values.

At 360, the depth image enhancement manager for multiview item recognition uses the RGB images, the corresponding model depth values, and the enhanced depth values to obtain RGB data corresponding to each of the current items in each of the RGB images, and provides an item code for each of the current items using the corresponding RGB data to perform a checkout of a customer without any item barcode requiring scanning and without any item barcode associated with the current items requiring entry into a user-facing interface of a transaction manager 143 and/or 153 during the checkout.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   selectively adjusting depth camera settings for cameras;
   wherein selectively adjusting comprises:
   setting each camera to a highest depth value allowable by a corresponding camera;
   setting an Infrared (IR) light emitter to project a textured light pattern over a scan zone; and setting the IR light emitter to alternate between turning on and turning off per frame captured by each camera;

capturing Red-Green-Blue (RGB) images and depth images of items placed in the scan zone during a checkout of a customer;

replacing existing depth values for the depth images with model depth values when the existing depth values are determined to be insufficient;

enhancing the existing depth values for the depth images by processing one or more depth interpolation algorithms when the existing depth values are determined to be sufficient to mitigate noise, missing values, or erroneous values; and processing the existing depth values and any model depth values to identify RGB data in each RGB image that is associated with each item; and providing an item code for each item within the scan zone using a corresponding RGB data.

2. The method of claim 1, wherein capturing further includes retaining at least two of a last eight frames captured within each depth image of each camera.

3. The method of claim 1, wherein capturing further includes providing the RGB images to a segmentation Machine-Learning Model (MLM) and receiving masks representing the items corresponding to each of the RGB images.

4. The method of claim 3, wherein providing the RGB images further includes adjusting the masks based on known background pixels associated with a background of the scan zone when no items are present in the scan zone.

5. The method of claim 4, wherein replacing further includes determining a set of the existing depth values are insufficient based on one or more of a smoothness of the set of the existing depth values, a total number of missing existing depth values in the set, and a total number of infinity-assigned existing depth values in the set.

6. The method of claim 5, wherein determining further includes obtaining a particular mask corresponding to the set of the existing depth values, determining a shape of the particular mask from a corresponding RGB image, determining a location of a center of the set within the scan zone, using the shape to identify a model table, and using the location to obtain the model depth values within the model table.

7. The method of claim 6, wherein enhancing further includes determining the existing depth values are sufficient based on the smoothness, the total number of missing existing depth values in the set, and the total number of infinity-assigned existing depth values.

8. The method of claim 7, wherein determining the existing depth values are sufficient further includes processing one or more of a grid-smoothing or hole-filling depth value interpolation algorithm, an edge sharpening depth value interpolation algorithm, a join disconnected regions depth value interpolation algorithm, and a shape broadening depth value interpolation algorithm.

9. The method of claim 8, wherein processing further includes adjusting the existing depth values for outlier values found in the existing depth values.

10. A method, comprising:
customizing depth settings for depth values captured by cameras based on known items captured by the cameras in a scan zone;
establishing lookup tables comprising model depth values for select items;
wherein establishing further includes:
establishing each lookup table with corresponding model depth values based on a shape of the select items associated with a corresponding shape;
obtaining Red-Green-Blue images and depth images from the cameras for current items placed in the scan zone;
replacing first depth values associated with the depth images with the corresponding model depth values;
interpolating second depth values associated with the depth images creating enhanced depth values; and
using RGB images, the corresponding model depth values, and the enhanced depth values to obtain RGB data corresponding to each of the current items in each of the RGB images and providing an item code for each of the current items using corresponding RGB data to perform a checkout of a customer without any item barcode associated with the current items requiring scanning and without any item barcode associated with the current items requiring manual entry into a transaction manager during the checkout.

11. The method of claim 10, wherein establishing each lookup table further includes providing sets of model depth values within each lookup table based on locations of each select item within the scan zone.

12. The method of claim 10, wherein interpolating further includes creating the enhanced depth values by replacing missing second depth values, smoothing select second depth values, and removing outlier second depth values.

13. A method, comprising:
customizing depth settings for depth values captured by cameras based on known items captured by the cameras in a scan zone;
establishing lookup tables comprising model depth values for select items;
obtaining Red-Green-Blue images and depth images from the cameras for current items placed in the scan zone;
replacing first depth values associated with the depth images with corresponding model depth values;
wherein replacing comprises:
determining that the first depth values are insufficient, determining a shape associated with a corresponding current item associated with the first depth values from a corresponding RGB image, identifying a corresponding lookup table from the shape, and obtaining the corresponding model depth values from the corresponding lookup table;
interpolating second depth values associated with the depth images creating enhanced depth values; and
using RGB images, the corresponding model depth values, and the enhanced depth values to obtain RGB data corresponding to each of the current items in each of the RGB images and providing an item code for each of the current items using corresponding RGB data to perform a checkout of a customer without any item barcode associated with the current items requiring scanning and without any item barcode associated with the current items requiring manual entry into a transaction manager during the checkout.

14. The method of claim 13, wherein identifying the corresponding lookup table further includes identifying the corresponding model depth values from within the corresponding lookup table based on a current location of a center of the shape within the scan zone.

* * * * *